United States Patent [19]
Golby et al.

[11] Patent Number: 5,469,259
[45] Date of Patent: Nov. 21, 1995

[54] INSPECTION INTERFEROMETER WITH SCANNING AUTOFOCUS, AND PHASE ANGLE CONTROL FEATURES

[75] Inventors: John A. Golby, Aschaffenburg, Germany; Miles J. Padgett, Impington; Stephen P. Woodall, Histon, both of England

[73] Assignee: International Business Machines Corporation, Armonk, N.Y.

[21] Appl. No.: 176,371

[22] Filed: Jan. 3, 1994

[51] Int. Cl.⁶ ........................................................ G01B 9/02
[52] U.S. Cl. ........................... 356/351; 356/345; 356/359
[58] Field of Search ..................................... 356/345, 351, 356/357, 359, 360; 250/225, 201.1, 201.2, 201.3

[56] References Cited

U.S. PATENT DOCUMENTS

| 3,849,003 | 11/1974 | Velzel | 356/109 |
|---|---|---|---|
| 4,298,283 | 11/1981 | Makosch et al. | 356/351 |
| 4,320,973 | 3/1982 | Fortunato et al. | 356/346 |
| 4,534,649 | 8/1982 | Downs | 356/351 |
| 4,714,348 | 12/1987 | Makosch | 356/351 |
| 4,844,616 | 7/1989 | Kulkarni et al. | 356/351 |
| 5,122,648 | 6/1992 | Cohen et al. | 356/359 |

FOREIGN PATENT DOCUMENTS

| 62-197706 | 9/1986 | Japan . |
|---|---|---|
| 1392395 | 7/1977 | United Kingdom . |

OTHER PUBLICATIONS

Korth et al, "Analyzing Optical Phase Structures," IBM Tech. Disclosure Bulletin, vol. 24, No. 6, Dec. 1981, pp. 3094–3095.

Makosch; "System for Stepless Beam Splitting," IBM Tech. Disclosure Bulletin, vol. 30, No. 11, Apr. 1988, pp. 249–250.

Frank–Schmidt et al, "Interferometric Method of Checking the Overlay Accuracy in Photolithographic Exposure Processes," IBM Tech. Disclosure Bulletin, vol. 32, No. 10B, Feb. 1990, pp. 214–217.

Bayer et al, "Photolithographic Process Control by Optical Phase Monitoring of Latent Images in Photoresist," IBM Tech. Disclosure Bulletin; vol. 34, No. 10A, Mar. 1992, pp. 140–143.

*Primary Examiner*—Samuel A. Turner
*Assistant Examiner*—Robert Kim
*Attorney, Agent, or Firm*—Romualdas Strimaitis; Richard A. Tomlin; Ronald V. Davidge

[57] ABSTRACT

An inteferometer is provided with a light source forming a first collimated beam shaped to illuminate an area and a second collimated beam shaped to illuminate a narrow line. Both of these beams are split into orthogonally-polarized sub-beams, which are diverted outward and inward within a compound Wollastom prism. The images of these beams are focussed on a test surface through an objective lens, with a real splitting point being projected to the rear focal plane of the objective lens. With light reflected off the test surface and projected back through the compound Wollastom prism, interference patterns are generated on the surface of a line sensor, which is typically used with illuminated narrow lines split by the compound prism and projected onto a moving test surface, and on the surface of an area sensor, which is typically used with area illumination projected onto a stationary test surface. Autofocus and automatic phase angle correction servomechanisms are also provided within the interferometer.

11 Claims, 3 Drawing Sheets

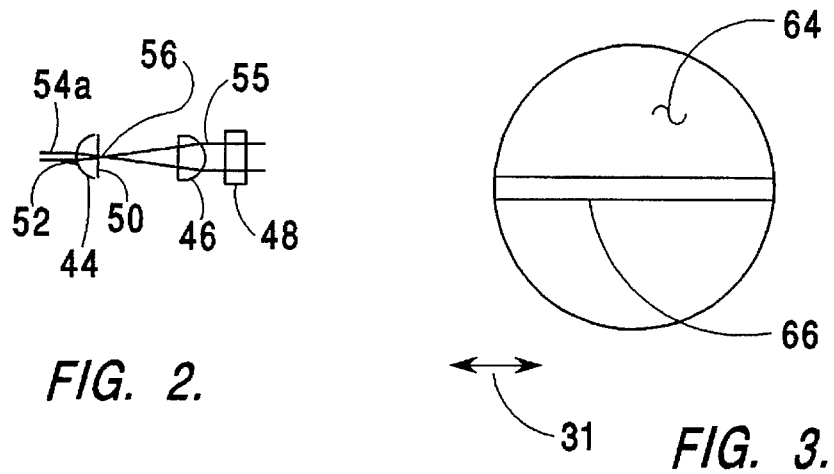
FIG. 2.
FIG. 3.
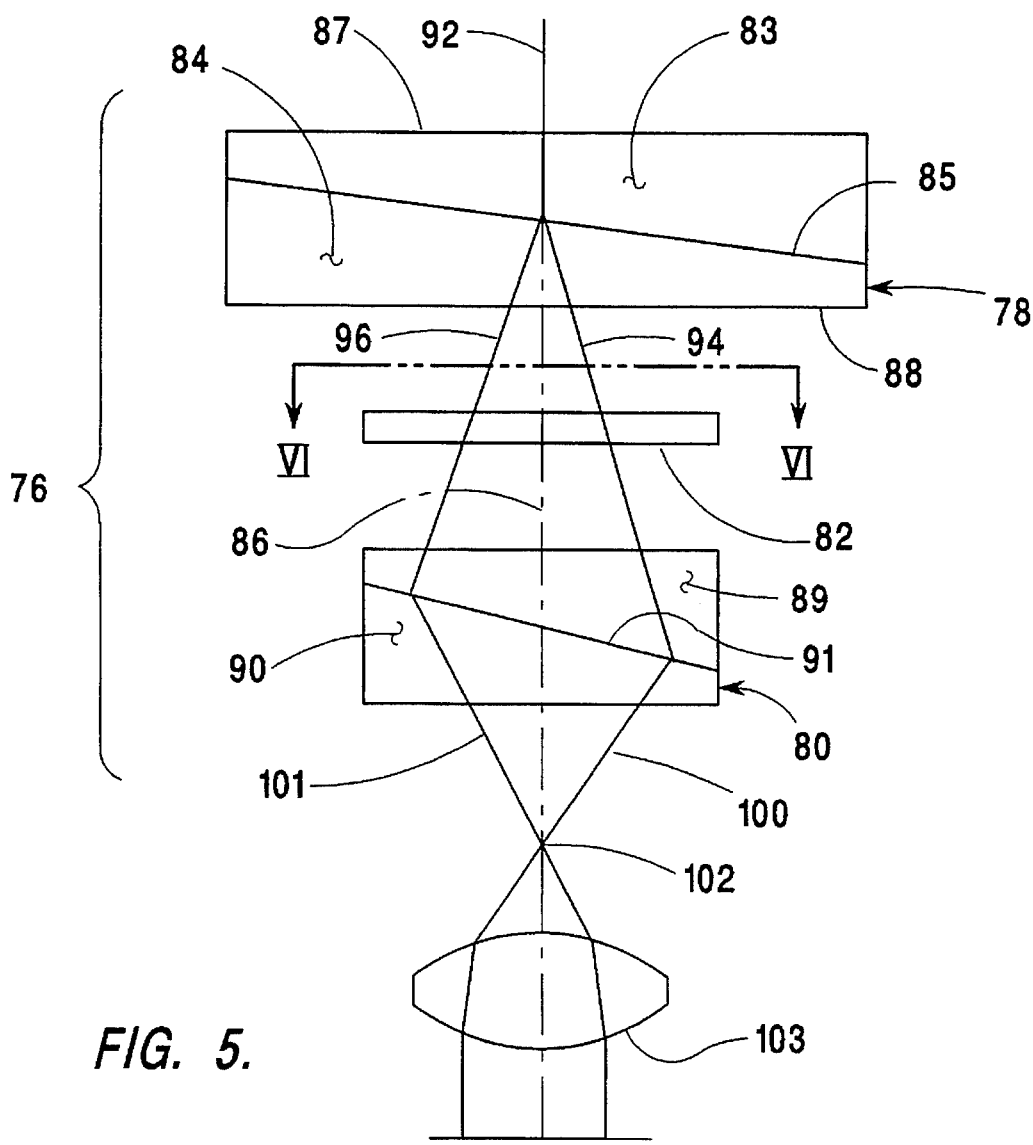
FIG. 5.

INSPECTION INTERFEROMETER WITH SCANNING AUTOFOCUS, AND PHASE ANGLE CONTROL FEATURES

BACKGROUND OF THE INVENTION

1. Field of the Invention

This invention relates to an interferometer, and more particularly, to an interferometer having features suited for the inspection of moving surfaces.

2. Background Information

A surface profile interferometer is a device for determining the roughness of a surface or the height of a step change in the thickness of a part being measured. Such a step change may be caused, for example, by the application of a metal film to a substrate in the manufacture of a printed circuit board or an integrated microcircuit. In general terms, an interferometer is an optical instrument in which two beams of light derived from the same monochromatic source are directed along optical paths of different length, in which the difference in length determines the nature of an interference pattern produced when the light beams are allowed to interfere. Since the beams of light are derived from the same monochromatic source, they are identical in wavelength. At equal path distances from the source, they are also in phase with one another. Phase differences between the beams therefore result only from differences in path length.

The phenomenon of light wave interference results from the mutual effect of two or more waves passing through the same region at the same time, producing reinforcement at some points and neutralization at other points, according to the principle of superposition.

With a photoelectric shearing interferometer, the height of a step change in a test surface may be measured using polarized light passed through a slit, through a Wolloston prism, and through a microscope objective lens, to form two images of the slit, with one image on each side of the step change. The beams reflected by the test surface pass through the lens and the prism, with an image being formed by two orthoganally polarized beams. The phase difference between these beams, which is determined by the height of the step, may be measured by the linear movement of a weak lens in a lateral direction (transverse to the beam) until the phase difference is exactly cancelled, as determined by the use of an electro-optic modulator, an analyzer, a photomultiplier, and a phase-sensitive detector, which are used together to detect the phase equality of the two interfering beams. The accuracy of the system depends on the precision to which the linear movement of the weak lens can be measured. Thus, a difference in phase between two orthogonal polarizations is measured, with the beams laterally displaced by the Wollaston prism, so that the system is not a common-path interferometer.

The Wollaston prism makes use of the phenomenon of double refraction or birefringence, through which a crystal of a transparent anisotropic material refracts orthogonally polarized light beams at different angles. Crystals such as calcite, quartz, and mica exhibit this property. A Wollaston prism includes two wedge-shaped segments held together with adjacent polished surfaces extending along a plane at an oblique angle to the optical axis of the device. The outer surfaces of the Wollaston prism lie along planes perpendicular to the optical axis of the device. The two segments of the Wollaston prism are composed of a birefringent material, with the crystal axes of the material lying perpendicular to each other and to the optical axis of the device.

For example, if a beam of light consisting of two sub-beams polarized orthogonally to each other is directed along the optical axis of the device to a Wollaston prism, the two beams will not be refracted at the initial surface of the prism, since it lies perpendicular to the direction of both beams. However, when the two beams reach the oblique surfaces inner surfaces of the two segments of the prism, refraction will occur, with the two beams being refracted at different angles because of the birefringence of the material of which the prism segments are composed. When the two beams reach the opposite external side of the prism, they are again refracted.

While the above discussion describes a Wolloston prism comprising two wedges of birefringent material, it is possible and often advantageous to form a prism of this kind using three or more such wedges, joined at two or more oblique planes. When this is done, the outer surfaces of the prism remain perpendicular to the optical center of the device.

Thus, a number of methods have been developed for using interferometers to provide accurate measurements of very small surface features. However, since these methods are based on rather elaborate and painstaking processes in which a very small surface area is held in place to be viewed through an interferometer, they are difficult to apply to the materials of a mass production process making, in large volumes, pads which would benefit from inspection by means of interferometry. What is needed, for example, is a way to apply a scanning process allowing a relatively large test surface to be checked without stopping for the measurement of individual areas. Such a process could then be applied, for example, to disks used for data storage.

DESCRIPTION OF THE PRIOR ART

U.S. Pat. No. 3,849,003 to Velzel describes an interferometer for measuring the roughness of a surface, including an optical system by means of which two images of the surface, having a mutual phase difference and displacement, are superimposed on one another. The phase difference is provided between two beam components polarized orthogonally by means of an electro-optical modulator. Reasonably monochromatic radiation is converted by a collimator lens into a parallel beam of radiation applied to the electro-optical modulator. From the modulator, there emerge sub-beams, which are polarized at right angles to one another, and which differ in phase from one another. This effect is achieved by applying a suitable electrical potential in the direction of propagation of the radiation beam. The displacement of the components is effected in an interferometer which discriminates with respect to the direction of polarization. Using this method, a stable interferometer having no moving parts can be built.

Velzel describes a series arrangement of two Wollaston prisms, which produce opposite angle splittings between two orthogonally polarized sub-beams of light entering the series arrangement. The angular splitting occurring in the first Wollaston prism is compensated in the second such prism. However, since the compensation is not effected in the same plane as the splitting, the two beams are displaced from one another by a distance which may be continuously varied by varying the distance between the prisms.

The two Wollaston prisms shown by Velzel are similar in geometry, except that the crystal axes of the segments in the second prism of the series are rotated 90 degrees from the crystal axes of the corresponding segments in the first prism.

This means that a beam consisting of orthogonally polarized sub-beams, entering the first prism parallel to the optical axis of the device is split to leave the second prism as two transversely displaced beams also parallel to the optical axis. Changing the lateral position of the Wollaston prism cannot be used to effect a change in the phase shift occurring between two beams reflected from the test specimen, since the symmetry of the compound prism prevents such a change from effecting the optical path lengths through the interferometer.

U.S. Pat. No. 4,320,973 to Fortunato et al shows the use of two Wollaston prisms of different sizes in series to receive a beam along the optical axis of the device, which is split into two diverging sub-beams in the first such prism to be brought back together at some distance past the second such prism. The intermediate plane of the second prism is inclined at an twice the angle and in the opposite direction when compared to the intermediate plane of the first prism.

In the *IBM Technical Disclosure Bulletin,* (Vol. 30, No. 11, p.p. 249–250), Makosch describes a method through which the diameter and spacing of the two laser light points produced by a device and reflected from a test surface are chosen independently of one another. A first lens focusses a collimated laser beam at the splitting plane of a first Wollaston prism, which splits the beam into two perpendicularly polarized partial beams diverging from one another at an angle. The two partial beams are redirected by means of a second lens in directions which would result in the beams being recombined in the intermediate image path of a microscope. However, before the two partial beams are recombined, they are deflected by a second Wollaston prism parallel to the optical axis of the device. In this manner, the laser light point is split in the intermediate image plane into two separate points. The spacing of these points changes linearly as a function of the spacing between the second Wollaston prism and the intermediate image plane at which recombination occurs. Thus, by moving the second prism along the optical axis, the spacing between the two points can be varied in a continuous (stepless) manner in this system from a value of zero to a finite value, without impairing the focussing of the points.

While a number of ways of building and using interferometers are described in these examples from the prior ad, a method to use an interferometer in a way allowing the continuous scanning of a surface being examined is not found. Such a method is needed to match the capabilities of interferometry with the capabilities of processes for producing parts and devices which would benefit from examination by interferometry. In particular, a method for scanning the relatively large surfaces of silicon wafers used in the production of integrated circuits is needed. Also, a method is needed to provide for the automatic focussing of an interferometer to compensate for changes in the thickness of test samples. Furthermore, a method is needed to provide for the automatic control of the phase shift between reflected sub-beams, as required to maintain darkfield interferometry despite gradual variations in the angular orientation of a test surface.

SUMMARY OF THE INVENTION

In accordance with one aspect of the invention, there is provided interferometer apparatus including an illumination mechanism, a beam splitting mechanism, a beam redirecting mechanism, a beam projection mechanism, a sensing mechanism, and a scanning mechanism. The illumination mechanism generates a coherent beam forming a collimated narrow line of illumination. The beam splitting mechanism splits the coherent beam into two orthogonally polarized sub-beams, having the same frequency, directed to travel from the beam splitting mechanism at a divergent angle from one another, with each sub-beam forming a collimated line of illumination. The beam projection mechanism projects the sub-beams from the beam redirecting mechanism to a test surface, with each sub-beam projecting a line on the test surface, with the lines extending parallel to one another. The sensing mechanism senses interference patterns produced when the sub-beams are reflected off the test surface. The scanning mechanism drives the test sample past the projection mechanism with the test surface exposed to the projection mechanism.

BRIEF DESCRIPTION OF THE DRAWINGS

A preferred embodiment of the subject invention is hereafter described with specific reference being made to the following Figures, in which:

FIG. 2 is a schematic cross-sectional plan view of a portion of an illumination arm of the interferometer of FIG. 1, taken as indicated by section lines II—II in FIG. 1;

FIG. 3 is a schematic cross-sectional elevation showing a light pattern projected from the illumination arm of the interferometer of FIG. 1, taken as indicated by section lines III—III in FIG. 1;

FIG. 5 is a schematic elevational view of a compound Wollaston prism built in accordance with an embodiment of the present invention;

DETAILED DESCRIPTION

Figure 1:
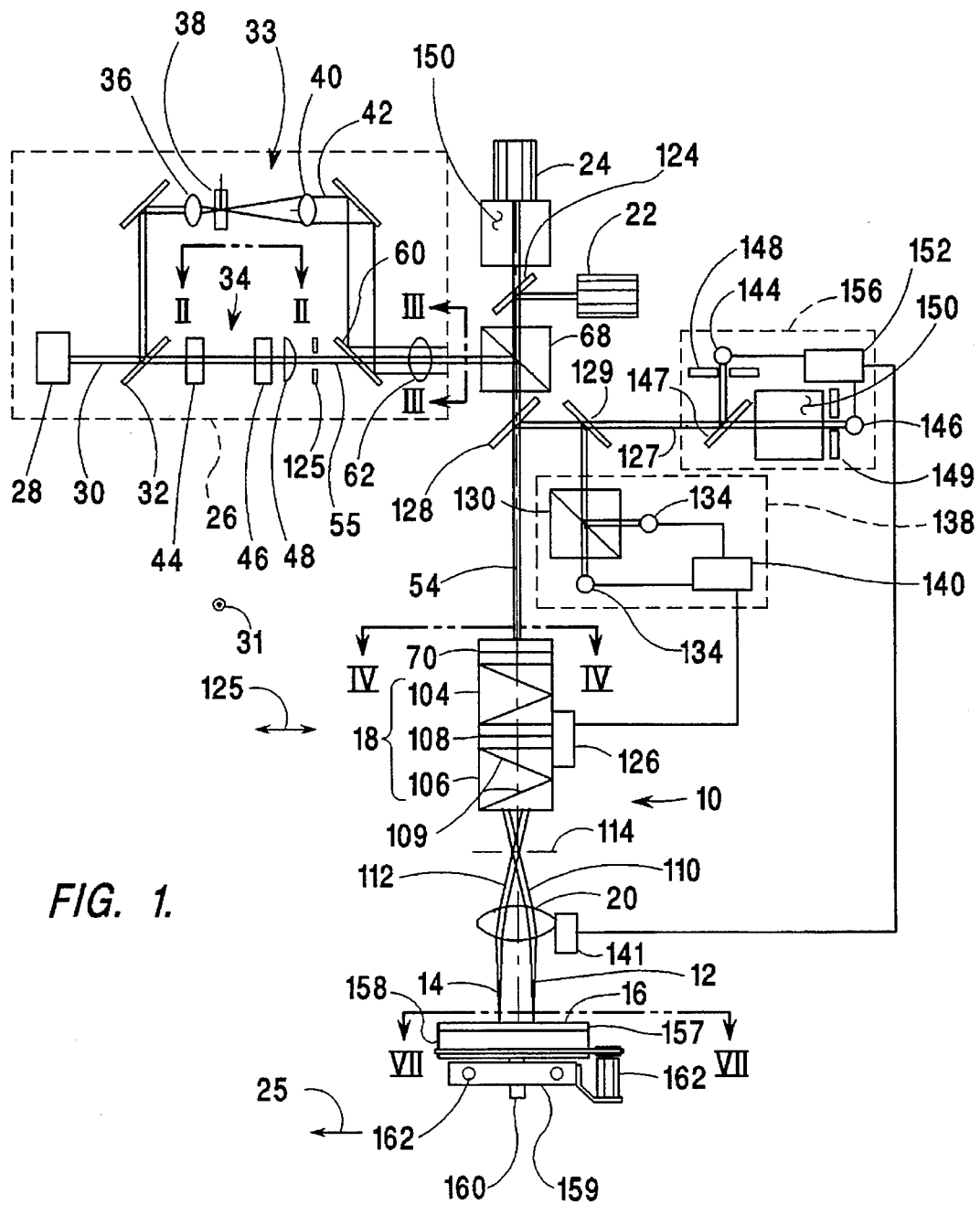
FIG. 1 is a schematic elevational view of an interferometer built in accordance with the present invention.

As shown in FIG. 1, an interferometer 10 is a common mode shearing type, producing a pair of sheared optical beams 12 and 14 both incident on a surface 16 being inspected. The sheared beams 12 and 14 are produced by a compound Wollaston prism 18, which projects a real splitting point in the rear focal plane of a microscope objective 20. The objective lens 20 forms interferograms of portions of surface 16 on both an area array CCD sensor 22, used for static surface acquisition, and a line scan CCD sensor 24, used for moving surface acquisition as the test surface 16 is moved past objective 20 in the direction of arrow 25. A dual-purpose illumination arm 26 provides both area and line illumination.

In the case of the acquisition of static surface information with area illumination, the interferogram at area array CCD sensor 22 is a dual image of the surface 16, with features laterally displaced by the amount of shear between beams 12 and 14 at test surface 16. These two images, formed using light beams of orthogonal polarities, are brought together at area array sensor 24. Since, when the two images are compared, the interference pattern resulting from an individual defect on test surface 16 is displaced, from one image to another, through the distance in which beams 12 and 14 are sheared, two interference patterns of such a defect appear, providing a form in which either interference pattern can be analyzed if the beams 12 and 14 are sheared sufficiently to avoid overlapping these patterns.

In the case of the acquisition of moving surface information, images of the two bright lines produced at the ends of sheared beams 12 and 14 along test surface 16, moving in the direction of arrow 25, are reflected upward through the interferometer 10, to be combined in an overlapping fashion at line scan CCD sensor 24. The illuminated lines formed on test surface 16 are sufficiently separated that a typical defect in test surface 16 appears in only one line at a time; therefore, only a single image of such a defect occurs at a time on the line of sensor 24.

Illumination arm 26 includes a laser 28, which produces a coherent and collimated light beam 30, having a diameter of about 0.7 mm, polarized to vibrate into and out of the plane of the drawing of FIG. 1, in the direction indicated by arrow 31. A beam splitting mirror 32 at the output of laser 28 divides the light beam 30 into a first portion directed along an upper light path 33 and a second portion directed along a lower light path 34.

Upper light path 33 includes a first lens 36, a diffuser 38, and a second lens 40 having a focal length substantially longer than that of first lens 36. Lenses 36 and 40 are arranged so that their focal points coincide at diffuser 38. In this way, while the light beam 42 projected from lens 40 is collimated, as is the light beam 30 from laser 28, light beam 42 has a substantially larger diameter than light beam 30. Diffuser 38 is included to improve the uniformity of light levels within light beam 42.

FIG. 2 is a schematic cross-sectional plan view of lower light path 34, taken as indicated by section lines II—II in FIG. 1. Various elements of this path are best understood by referring to both FIGS. 1 and 2. Thus, lower light path 34 includes a first cylindrical lens 44, a second cylindrical lens 46 and a third cylindrical lens 48, which are together arranged to produce an elongated light pattern of particular value in the inspection of a scanning, or moving test surface 16. Each cylindrical lens includes, for example, a flat surface 50 at one side and a curved surface 52, formed as a section of a cylinder, at an opposite side. First cylindrical lens 44 and second cylindrical lens 46 are both oriented so that the axes of their cylindrically curved surfaces 52 extend parallel to the optical axis 54 of interferometer 10. Third cylindrical lens 48 is oriented so that the axis of its cylindrically curved surface 52 extends perpendicularly to optical axis 54 and parallel to the direction indicated by arrow 31.

While the shape of the light beam 55 travelling along lower path 34, as viewed from the side, in the plane of FIG. 1, is virtually unchanged by first cylindrical lens 44 and second cylindrical lens 46, this beam is driven into a gradual convergence, or narrowing in this plane by passage through third cylindrical lens 48.

Referring to FIG. 2, first cylindrical lens 44 and second cylindrical lens 46 are arranged to have focal axes along a common line 56, extending parallel to the interferometer optical axis 54 (shown in FIG. 1). The radii of curvature of the curved surfaces of these lenses 44 and 46 are also chosen so that, as viewed in FIG. 2, light beam 54a is spread to a widened beam 55 passing through these cylindrical lenses. Because of its orientation, third cylindrical lens 48 does not significantly change the shape of light beam 55 as it is viewed in FIG. 2.

Referring again to FIG. 1, upper light beam 42 and lower light beam 55 are combined at a beam splitting mirror 60, to be projected into the remaining portion of interferometer 10 through a field lens 62.

FIG. 3 is a schematic view of the light beams projected from illumination arm 26, being taken as a cross-sectional elevation along section lines III—III in FIG. 1. Referring to FIG. 3, the light from upper path 33 is projected as a round collimated light beam 64, while the light from lower path 34 is projected as a horizontally oriented narrow beam 66. Both round beam 64 and narrow beam 66 are polarized in the direction of arrow 31, and both of these beams are collimated.

Referring again to FIG. 1, the light beams projected from illumination arm 26 are directed downward, along optical axis 54 by means of a polarizing beam splitter 68. Advantage is preferably taken of the fact that both light beams from illumination arm are polarized in the direction of arrow 31. It is possible to reflect up to 90 percent of the polarized light downward, along axis 54, while only 10 percent of this polarized light is transmitted through polarizing beam splitter 68. While only a relatively narrow beam is shown travelling through interferometer 10 outside illumination arm 26, this simplification has been provided simply to avoid obscuring the clarity of the drawing; it is understood that the relatively wide area beam from upper light path 33 is also present.

Figure 4:
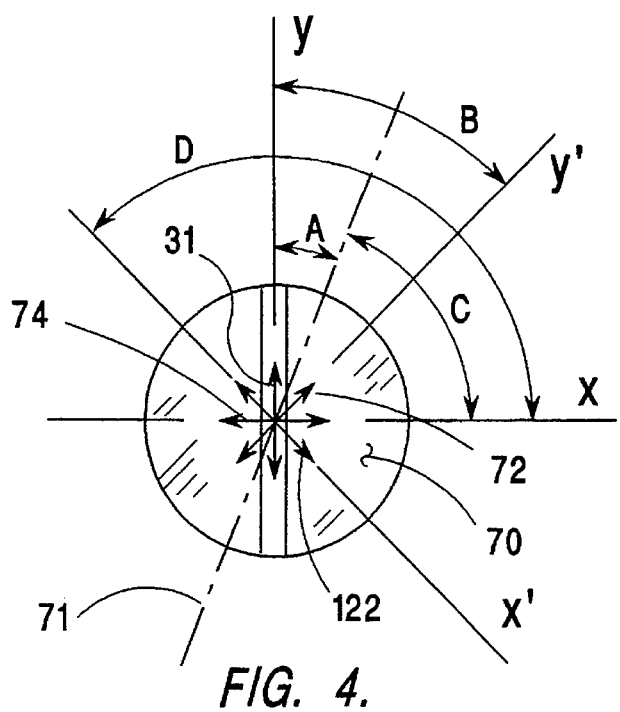
FIG. 4 is schematic cross-sectional plan view showing light patterns projected through a first half-wave plate of the interferometer of FIG. 1, taken as indicated by section lines IV—IV in FIG. 1.

FIG. 4 is a schematic plan view, taken as indicated by section lines IV—IV in FIG. 1, to show the transmission of light through a half-wave plate 70 placed atop compound Wollaston prism 18 (both shown in FIG. 1). Polarized light is transmitted downward to this plate 70 from polarizing beam splitter 68. A coordinate system has been applied within this figure to simplify the discussion of certain concepts. Thus in FIG. 4, the direction extending to the right of FIG. 1, is defined as the x-direction, while the direction into the paper of FIG. 1 is defined as the y-direction.

Referring to FIG. 4, the transmission of linearly polarized light through a half-wave plate, such as plate 70, results in rotation of the angle of polarization through an angle which is twice the angle between the crystal axis of the material composing the half-wave plate and the axis of polarization of light entering the plate. The light reflected from polarizing beam splitter 68 enters half-wave plate 70 polarized along a y-axis, in the direction of arrow 31. The crystal axis of half-wave plate 70 is parallel to line 71, at a 22.5-degree angle, indicated as angle A, from this plane of polarization. Therefore, light leaves plate 70 polarized in the direction of arrow 72, with the plane of polarization having been rotated through a 45-degree angle, indicated as angle B.

While light subsequently enters prism 18 polarized in the direction of arrow 72, at a 45-degree angle with respect to the crystal axes of the each segment of prism 18, the interaction between this polarized light and the crystal structure within Wollaston prism 18 results in the polarized light transmitted downward through the prism 18 being effectively broken into equal portions of light polarized in the directions of arrows 31 and 74. The light entering prism 18 is the vector sum of the light transmitted through the prism polarized in the direction of arrow 31 and the light transmitted through the prism polarized in the direction of arrow 74.

FIG. 5 is a schematic elevational view of a compound Wollaston prism configured and used in the manner of the present invention. In order to simplify discussion of the paths of individual light rays, the design of the various elements has been simplified, with each individual Wollaston prism being shown as a two-element device, instead of the three-element device shown in FIG. 1. However, the operation of the apparatus of FIG. 5 is similar to that of the apparatus of FIG. 1, and either type of apparatus may be used in the practice of the present invention.

Referring to FIG. 5, a compound Wollaston prism 76 includes a first two-element Wollaston prism 78 and a second two-element Wollaston prism 80. A half-wave plate 82 is placed between the prisms 78 and 80. All of the elements of prisms 78 and 80 are made of a birefringent material, such as quartz. The half-wave plate 82 may also be made of quartz. The two elements 83 and 84 of first prism 78 are adjacent along an intermediate plane 85 at an oblique angle to the optical axis 86 of the device. Both outer surfaces 87 and 88 of prism 78 are perpendicular to optical axis 86. Elements 83 and 84 have crystal axes which are perpendicular to each other and to optical axis 86. One of these crystal axes is parallel to intermediate plane 85.

Second Wollaston prism 80 is similar in composition to first prism 78, with the first element 89 and second element 90 crystal axes parallel to the crystal axes of first element 83 and second element 84 of first prism 78, respectively. However, intermediate plane 91 of second prism 80 is not parallel to intermediate plane 85 of first prism 78, and the thicknesses of corresponding elements, in the direction of optical axis 86, may vary between the two prisms.

An incoming light ray 92 is directed parallel to optical axis 86 of the device, being polarized at a 45-degree angle to both crystal axes of the elements in prism 78. As explained above in reference to FIG. 4, within prism 78, this ray 92 is divided into a first ray 94 and a second ray 96, which are polarized orthoganally to one another. These rays 94 and 96 begin diverging at intermediate plane 85 due to the birefringent property of the material of which prism 78 is composed.

Figure 6:
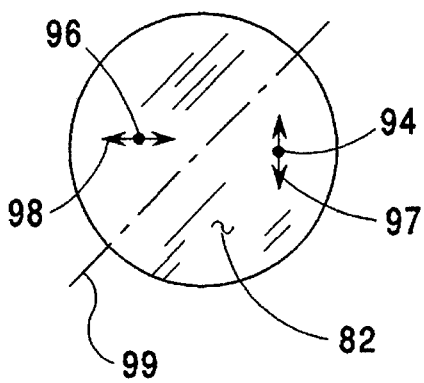
FIG. 6 is a schematic cross-sectional plan view showing light patterns projected through a half-wave plate within the compound Wollaston prism of FIG. 5, taken as indicated by section lines VI—VI in FIG. 5.

Referring to FIG. 6, a cross-sectional diagram taken as indicated by section lines VI—VI in FIG. 5, light ray 94 enters half-wave plate 82 polarized in a direction indicated by arrow 97, while light ray 96 enters plate 82 polarized in a direction indicated by arrow 98. The crystal axis of the material of half-wave plate 82 is parallel to line 99, lying at a 45-degree angle with respect to the planes of polarization of both light rays 94 and 96. Thus, the planes of polarization of both light rays 94 and 96 are rotated 90 degrees as these rays pass through the plate 82.

Referring again to FIG. 5, this rotation of the planes of polarization causes light ray 94, which was refracted toward the right (as viewed in the figure) as it is transmitted through first prism 78, to be refracted back toward the left as it is transmitted through second prism 80. Similarly, light ray 96, which was refracted toward the left during transmission through first prism 78 is refracted toward the right during transmission through second prism 80. Thus, the resulting light rays 100 and 101 leaving second prism 80 converge at an intersection point 102.

A microscope objective lens 103 is preferably located so that its focal point lies at the intersection point 102 of light rays 100 and 101. Since these rays 100 and 101 pass through the focal point of the lens 103, they are refracted to travel parallel to each other and to the optical axis 86 upon leaving the lens 103.

Referring again to FIG. 1, compound Wollaston prism 18 is made up of a first Wollaston prism 104 and a second Wollaston prism 106, together with an intermediate half-wave plate 108 having a crystal axis placed at an angle of 45 degrees relative to the directions of polarization of light travelling between first prism 104 and second prism 106, as described above in reference to FIG. 6. Despite the additional elements in compound prism 18, this compound prism 18 functions in a manner similar to that described above in reference to FIG. 5. Compound Wollaston prism 18 is like compound Wollaston prism 75 (of FIG. 5) in that the first and second prisms 104 and 106 differ, for example, in the angles of their intermediate planes 109 and the thicknesses of their components in the direction of optical axis 52.

However, since the light beams provided by illumination arm 26 are collimated beams, cross-sectionally shaped as shown in FIG. 4, instead of the individual rays discussed in reference to FIG. 5, these beams leave compound Wollaston prism 18 as collimated beams 110 and 112, which are individually directed inward while remaining polarized orthogonally to each other.

A microscope objective lens 20 is preferably placed with a rear focal plane 114 aligned at the intersection of central rays within the beams 110 and 112, and with a front focal plane aligned at test surface 16. In this way, each beam 110 and 112 is refracted to leave lens 20 in a direction parallel to optical axis 54, and the two beams are individually condensed, with the lines formed by light from lower path 34 in illumination arm 26 forming two small, bright lines of light. In this way, a real split splitting point is projected to the rear focal plane of the objective lens 20, even if this plane is physically inaccessable.

Thus, while the orthoganally polarized rays of the interferometer described in U.S. Pat. No. 3,849,003 to Velzel leave the second Wollaston prism in a direction parallel to the optical axis of the device, the rays of interferometer 10 leave the second Wollaston prism 106, being directed toward the optical axis of the device. This arrangement of interferometer 10 provides for flexibility in the projection of a real splitting point while avoiding a need for an objective lens to drive the various rays back into convergence. Furthermore, the placement of a lens between the two Wollaston prisms, as advocated by Makosch in the *IBM Technical Disclosure Bulletin*, Vol. 10, No. 11, p.p. 259–250, is not required to bring the rays back into convergence.

Figure 7:
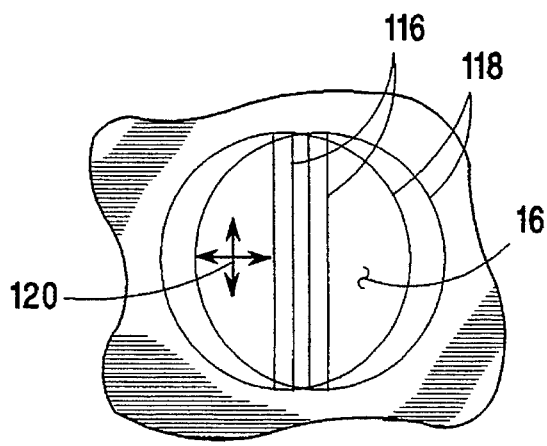
FIG. 7 is a schematic plan view of a light pattern produced by the interferometer of FIG. 1 on a surface being tested, taken as indicated by section lines VII—VII in FIG. 1.

FIG. 7 is a cross-sectional plan view, taken as indicated by section lines VII—VII in FIG. 1, schematically showing the illumination pattern thus produced on surface 16. This illumination pattern includes a pair of brightly illuminated lines 116, resulting from the light transmitted along lower path 34 of the illumination arm 26, and a pair of illuminated areas 118, resulting from the light transmitted along upper path 33 of the illumination arm. The light in this illumination pattern is orthogonally polarized in the planes indicated by crossed arrows 120, with one of the illuminated lines 116 and a corresponding illuminated area 118 being polarized in one such plane, while the other illuminated line 116 and the other illuminated area 118 are polarized in the other such plane. The illumination pattern provided by illuminated lines 116 is particularly useful for measuring a test surface 16 moving in a scanning motion in the direction indicated by arrow 25 (or in the direction opposite to arrow 25), while the illumination pattern provided by areas 118 is particularly useful for measuring a test surface 16 held in a stationary condition.

The light from the lower path 34 may be focused, for example, into a pair of lines, each of which has a width of 4 microns, separated by a center-to-center distance of 60 microns. This center-to-center distance is the shear distance of the interferometer, effecting the displacement of the circular illuminated areas 118 as well.

Residual straight fringes in the interferometer 10 may be removed by the choice of splitting angles, with splitting angles preferably being chosen to create a splitting plane perpendicular to the optical axis 54. Residual hyperbolic fringes are removed by having the second Wollaston prism 106 compensate for the first Wollaston prism 104.

The illumination from orthogonally polarized beams 12 and 14 is reflected from test surface 16 to be returned through microscope objective 20 and compound Wollaston prism 18 along the paths traveled by light moving downward toward test surface 16 from polarizing beam splitter 68. At half-wave plate 108, the directions of polarization of both reflected light beams are rotated 90 degrees, as previously described in reference to half-wave plate 82 (shown in FIG. 6). This rotation prepares the light beams to be recombined by first Wollaston prism 104.

Referring again to FIG. 4, light reflected from test surface 16 (shown in FIG. 1) enters the lower surface of half-wave plate 70 with one beam polarized in the direction of the x-axis, as indicated by arrow 74, while the other beam is polarized in the direction of the direction of the y-axis, as indicated by arrow 31. Since the crystal axis of plate 70 is parallel to line 71, at a 22.5-degree angle A with respect to the y-axis, the polarization angle of light polarized in the direction of arrow 31 is rotated through a 45-degree angle B, to a direction of polarization indicated by arrow 72. Since the crystal axis of plate 70 is at a 67.5-degree angle C relative to the x-axis, the polarization angle of light polarized in the direction of arrow 74 is rotated through a 135-degree angle D, to a direction of polarization indicated by arrow 122. For continued reference, the axis of polarization of the light which was previously polarized along the y-axis is defined as the y'-axis, and the axis of polarization of the light which was previously polarized along the x-axis is defined as the x'-axis.

Referring again to FIG. 1, a portion of this reflected light continues along optical axis 54, past polarizing beam splitter 68, to a beam splitting mirror 124, which directs a portion of the light to the area CCD array of sensor 22 and a remaining portion of the light to the line scan CCD array of sensor 24. During the use of the interferometer 10 to acquire information about a moving surface, with a line of illumination projected on sensor 24, both line illumination through lower illumination path 34 of illumination arm 26 and area illumination through upper illumination path 33 are provided. In this application of interferometer 10, it is not necessary to block the upper illumination path 33, since the intensity of illumination provided through this path is much lower than the intensity of the illuminated lines 116 (shown in FIG. 7). On the other hand, when interferometer 10 is used to acquire information about a static surface through area illumination provided by upper illumination path 33, the light from lower illumination path 34 is blocked by closing a shutter 125 in this path.

A method for controlling the phase angle between the two orthogonally polarized light beams returned upward to sensors 22 and 24 will now be discussed, at first with continuing reference being made to FIG. 1.

Compound Wollaston prism 18 is mounted within the interferometer 10 in a manner allowing lateral motion along a line extending perpendicular to the optical axis of the compound prism 18, in either direction indicated by arrow 125. The compound prism 18 is moved laterally by means of a piezoelectric actuator 126. Since the first prism 104 and the second prism 106 are different in such parameters as the angles of intermediate planes 109 and the thicknesses of segments, this lateral movement of compound prism 18 changes the relative path lengths traveled by the two light beams 110 and 112. Since a change in relative path lengths introduces a phase angle difference between the two light beams 110 and 112, the lateral movement of compound prism 18 is used to control the phase angle between the sheared optical beams 12 and 14. The phase difference generated in this way can be used to bias the operation point of the interferometer 10. This phase difference may alternately be used in compensating for the tilt of surface 16, as such tilt introduces a phase shift between the sheared beams 12 and 14.

Interferometer 10 is usually operated to produce a darkfield interferogram, having a dark background caused by cancelling, through the interference phenomenon, of light reflected from the flat surface of test sample 16. Both bumps and depressions in the surface result in the appearance of illuminated interference patterns on the dark background. This type of pattern usually proves to be the easiest pattern to read. This darkfield effect occurs when the two orthogonally-polarized light images reflected from the flat portion of test surface 16 are 180 degrees out of phase.

Referring again to FIG. 4, as previously discussed, light reflected from test surface 16 leaves half-wave plate 70 as two beams orthogonally polarized along the directions of the x'- and y'-axes. While it is understood that this light pattern can alternatively be considered as beams polarized along other orthogonal axes, examining the light in terms of polarization along the x'- and y'-axes is particularly useful, since the components of light polarized along these axes correspond to the orthogonal components of light reflected at the test surface, polarized along the x- and y-axes. If the beams polarized along the x'- and y'-axes are 180 degrees out of phase, as the light level of a beam polarized along the x'-axis increases from the origin in the x' direction, the light level of the beam polarized along the y'-axis increases similarly from the origin in the -y' direction. These two beams are resolved into a single beam increasing at this point in the -y direction. Thus, the two beams polarized along the x' and y' axes, 180 degrees out of phase, are resolved as a single beam polarized along the y axis. At the other extreme, when the two beams polarized along the x'- and y'-axes are in phase, as the light level of the beam polarized along the x'-axis increases from the origin in the x' direction, the light level of the beam polarized along the y'-axis increases from the origin in the y' direction. These two beams are resolved into a single beam increasing at this point in the x direction. Thus, the two beams in phase are resolved as a single beam polarized along the x axis. Other phase relationships between light beams 122 and 124 do not resolve into a single linearly polarized beam.

Referring again to FIG. 1, the 180-degree out of phase condition required for darkfield interferometry can thus be readily detected by measuring the light levels returned along optical axis 54 above half-wave plate 70, polarized in orthogonal directions. Toward this purpose, a fraction of the light reflected from surface 16 is directed along a split optical path 127 by a beam splitting mirror 128. A portion of the light directed along optical path 127 is directed by another beam splitting mirror 129, to a polarizing beam splitter 130, providing for the transmission of light at a first polarization to a photodetector 134 and for the reflection of light polarized orthogonally to the first polarization to the other photodetector 134. The angle of the first polarization may be changed by varying the construction of polarizing beam splitter 134. For example, the crystal angle of the materials composing beam splitter 134 may be varied for this purpose. Polarizing beam splitter 134 is preferably configured so that a portion of the light traveling upward from half-wave plate 70, polarized in the direction of the x'-axis is directed into one of the photodetectors 134, while a portion of this light polarized in the direction of the y'-axis is directed into the other of the photodetectors. Photodetectors 134 form part of a optical phase servo system 138, which drives piezoelectric actuator 126 to move compound Wollaston prism 18 laterally.

Changes in the state of polarization of the light received along split optical light path 127, occurring due to tilt of surface 16, result in a differential error signal, which is fed back to a controller 140 within servo system 138 to close the control loop. The relative phase control servo system 138 can be set to move the compound prism 18 so that any state of optical phase bias is produced in the interferometer 10, from a darkfield at a phase difference of 180 degrees to a brightfield at a phase difference of 0 degrees, and to make whatever corrections are necessary to maintain the apparatus in any such state.

If polarizing beam splitter 130 is configured according to the preferable method described above, under both brightfield and darkfield conditions the output of the two photodetectors 134 is equal. The overall output of one of the sensing arrays 22 or 24 may be applied as an input to controller 140 to allow descrimination between brightfield and darkfield condtions.

Alternatively, polarizing beam splitter 130 may be configured so that a portion of the light travelling upward from half-wave plate 70, polarized in the direction of the x-axis is directed into one of the photodetectors 134, while a portion of this light polarized in the direction of the y-axis is directed into the other of the photodetectors 134. With this alternative, to obtain and maintain darkfield operation, compound Wollaston prism 18 may be moved so that the output of the detector 134 measuring light polarized in the direction indicated by arrow 125 is driven to zero, while the output of the detector 134 measuring light polarized in the direction indicated by arrow 31 is maximized.

An autofocus system is used to maintain the focus of the main imaging path of interferometer 10. The objective lens 20 is mounted in a way allowing motion in either direction along device optical axis 54. This lens 20 is moved by a piezoelectric actuator 141 in response to changes in the average position of surface 16, which may be caused, for example, by variations in the thickness of the part being examined. These changes in surface position are detected using a pair of photodetectors 144 and 146. A beam splitting mirror 147 is provided within split optical path 127, so that a portion of the light transmitted past beam splitting mirror 129 is reflected to photodetector 144, while the remainder of this light is transmitted to photodetector 146. Slit aperture plates 148 and 149 are placed between the split optical path 127 and photodetectors 144 and 146.

The CCD arrays of area sensor 22 and line sensor 24 are arranged to have equal optical path lengths to half-wave plate 70. A glass spacer 150 may be included in one of these paths to aid in the achievement of equal optical path lengths. When objective lens 20 is properly focussed on test surface 16, a maximum level of illumination is reached at the central part of the image formed at the CCD array of either sensor 22 or 24. At optical path distances greater than or less than the distance to these CCD arrays, the illumination returning from reflection off test surface 16 is spread out. Thus, the illumination pattern is said to have a "waist," with the narrowest portion at each of the CCD arrays.

The slits in aperture plates 148 and 149 are arranged so that photodetectors 144 and 146 view only a narrow central portion of the reflected light beam. While the optical path length from half-wave plate 70 to aperture plate 148 is somewhat shorter than the optical path length from plate 70 to one of the CCD arrays 22 or 24, the optical path from plate 70 to aperture plate 149 is somewhat longer than the optical path length to one of the CCD arrays 22 or 24. A glass spacer 150 may be used to help establish the appropriate optical path lengths. When objective lens 20 is properly focused on target surface 16, equal illumination levels are read by photodetectors 144 and 146, so lens 20 is held in position. When photodetector 144 receives more light than photodetector 146, indicating that the waist of the illumination profile is closer to aperture 148 than to aperture 149, lens 20 is moved in a direction which moves the waist outward along the optical path. Similarly, when photodetector 146 receives more light than photodetector 144, indicating that the waist of the illumination profile is close to aperture 149 than to aperture 148, lens 20 is moved in a direction which moves the waist inward along the optical path. To provide these movements, the outputs of photodetectors 144 and 146 are directed to an autofocus controller 152 within autofocus servo system 156. A difference between the outputs of photodetectors 144 and 146 results in the generation of a differential error signal within controller 152, which in turn results in the variation of the control signal provided from controller 152 to piezoelectric actuator 141.

While many types of objects with high reflectivity can be inspected using inteferometer 10, an important application of the device in examining the surface of a disk-shaped test object 157, such as the disk manufactured for use as a storage medium. To further facilitate the acquisition of such surface information, a chuck 158, rotatably mounted in a carriage 159 and driven about a pivot shaft 160 by a motor 162, is provided to hold the test object 157 and to drive its surface 16 past the illuminated lines 12 and 14 in the direction of arrow 25. A vacuum clamp or other hold down means may be provided to hold test object 157 in place on chuck 158. Carriage 159 is in turn driven in either of the directions indicated by arrow 31 by means of a leadscrew 162. The resulting motion causes the interferometer 10 to view a spiral portion of surface 16 of disk 156.

The scanning capabilities of interferometer 10, whether used to scan a disk surface in a spiral fashion as described or to scan a surface driven past the interferometer in a linear fashion are critically important in an effort to develop a method for inspecting various types of parts. As described above, the scanning process can be performed in an automated manner, without stopping to repeat setting up the device, while the relative phase control servo system 138 operates to compensate for gradual changes in the angular alignment of the test surface being viewed, and while the autofocus servo system 156 operates to compensate for gradual changes in the elevation of the test surface being viewed.

Figure 8:
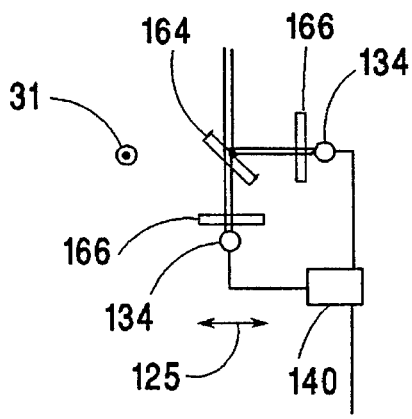
FIG. 8 is a schematic elevational view of an alternative beam splitting portion of a phase angle control servomechanism built in accordance with the present invention.

FIG. 8 shows an alternative construction of a mechanism for providing feedback concerning the phase angle between the orthogonally polarized beams returned as reflections from test surface 16. Instead of the polarizing beam splitter described above in reference to FIG. 1, a beam splitting mirror is provided to divide light between the two photodetectors 134. A polarizing plate 166 is provided between each photodetector 134 and the mirror 156. These plates 166 are arranged so that light polarized in one direction passes through to one of the photodetectors 134, while light polarized orthogonally to this direction passes through to the other of the photodetectors 134. The output of the photodetectors 134 are used as described above to control phase shift.

While the invention has been described in a form including specific means for acquiring linear interference images from moving test surfaces and area interference images from stationary test surfaces, it is understood that the various features specific to either of these modes of operation could be eliminated, with the device being configured in accordance with the invention to provide various advantages for use in the remaining such mode. While the invention has been described in a preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Interferometer apparatus comprising:

illumination means for generating a coherent beam, wherein said coherent beam forms a collimated narrow line of illumination;

beam splitting means for splitting said coherent beam directed to said beam splitting means along an optical axis, into two orthogonally polarized sub-beams, having the same frequency, wherein said sub-beams are directed to travel from said beam splitting means at a divergent angle from one another, wherein each said sub-beam forms a polarized line of illumination, beam redirecting means for directing said sub-beams traveling at a divergent angle to travel in a convergent angle to intersect in a plane of intersection, wherein said beam splitting means and said beam redirecting means are configured so that motion of said beam splitting means and said beam redirecting means, being moved together in a lateral direction perpendicular to said optical axis, elongates an optical path traveled by one of said sub-beams while shortening an optical path traveled by another of said sub-beams;

beam projection means for projecting said sub-beams from said beam redirecting means to a test surface of a test sample, wherein said each said sub-beam projects a line on said test surface, said lines extending in a first direction parallel to one another;

first sensing means for sensing interference patterns produced as said sub-beams are reflected off said test surface;

scanning means for driving said test sample past said projection means in a direction perpendicular to said first direction, with said test surface exposed to said projection means;

phase angle sensing means for sensing a phase angle relationship between reflections of said sub-beams from said test sample; and phase angle controlling means for varying said phase angle relationship in response to said phase angle sensing means, wherein said phase angle controlling means includes lateral drive means for moving said beam splitting means and said beam redirecting means together in said lateral direction.

2. The interferometer apparatus of claim 1, wherein said lateral drive means includes a piezoelectric actuator.

3. Interferometer apparatus comprising:

illumination means for generating a coherent beam, wherein said coherent beam forms a collimated narrow line of illumination, wherein said coherent beam additionally forms a collimated area of illumination, wherein said illumination means includes a laser producing a collimated laser output beam, first beam expanding means for expanding said laser output beam in a direction of expansion to form said collimated narrow line of illumination, second beam expanding means for expanding said laser output beam to form said collimated area of illumination, means for directing said collimated laser output to said first beam expanding means, and means for combining light from said first beam expanding means and from said second beam expanding means;

beam splitting means for splitting said coherent beam into two orthogonally polarized sub-beams, having the same frequency, wherein said sub beams are directed to travel from said beam splitting means at a divergent angle from one another, wherein each of said sub-beams forms a polarized line of illumination;

beam redirecting means for directing said sub-beams traveling at a divergent angle to travel in a convergent angle to intersect in a plane of intersection;

beam projection means for projecting said sub-beams from said beam redirecting means to a test surface of a test sample, wherein said each of said sub-beams projects a line on said test surface, said lines extending in a first direction parallel to one another;

first sensing means for sensing interference patterns produced as said sub-beams are reflected off said test surface, wherein, after reflection from said test surface, said sub-beams travel through said beam projection means, said beam redirecting means, and said beam splitting means, being recombined and focussed on said first sensing means at a first optical path length from said beam splitting means, and wherein said first sensing means is configured to sense interference patterns produced by reflections of said lines on said test surface;

second sensing means for sensing interference patterns produced by reflections of said area of illumination on said test surface; and scanning means for driving said test sample past said projection means in a direction perpendicular to said first direction, with said test surface exposed to aid projection means.

4. The interferometer apparatus of claim 3:

wherein said first beam expanding means includes a first cylindrical lens having a surface forming part of a first cylinder with an axis extending perpendicularly to said direction of expansion, through which said collimated laser beam is directed to be condensed to extend along an intermediate line extending perpendicularly to said direction of expansion, and a second cylindrical lens having a surface forming pad of a second cylinder with an axis extending perpendicularly to said direction of expansion, through which light from said intermediate line is directed to be refracted into a collimated beam extending as a line in said direction of expansion;

wherein said second beam expanding means includes a first lens, directing light from said collimated laser beam through a focal point, and a second lens directing light from said focal point to form said collimated area of illumination; and wherein said means for directing includes a beam splitting mirror reflecting and transmitting portions of light from said laser beam; and wherein said means for combining light includes a beam splitting mirror, reflecting and transmitting light to said coherent beam.

5. The interferometer apparatus of claim 4, wherein said illumination means additionally includes a shutter for blocking the transmission of light from said laser through said first beam expanding means to said coherent beam when measurements are taken with said collimated area of illumination.

6. Interferometer apparatus comprising:

means for projecting a light beam along an optical axis, wherein said light beam includes a first sub-beam polarized in a first direction and a second sub-beam polarized in a second direction, said first and second directions being perpendicular to each other and to said optical axis, wherein said means for projecting a light beam includes, a second half-wave plate with a crystal axis at 22.5 degrees from said first direction, and a laser projecting a laser beam polarized in said first direction through said second half-wave plate;

first and second Wollaston prisms aligned in a series arrangement along said optical axis, wherein said first and second Wollaston prisms are composed of birefringent materials having crystal axes parallel to said first and second directions, wherein said laser beam polarized in said first direction is projected through said second half-wave plate to said first Wollaston prism, wherein said sub-beams are split apart within said first Wollaston prism and directed together by said second Wollaston prism, to intersect at a crossover point outside said second Wollaston prism wherein said first and second Wollaston prisms are fixtured together in a compound prism assembly, said compound prism assembly being fixtured for movement in a direction perpendicular to said optical axis, wherein said first and second Wollaston prisms are configured so that motion of said compound prism assembly in said direction perpendicular to said optical axis introduces a phase difference between said sub-beams;

an objective lens with a focal plane at said crossover point;

means for supporting a test specimen with a test surface at a front focal plane of said objective lens;

first beam splitting means between an illumination path along which said laser beam is directed toward said second half-wave plate, and a sensing path; and first sensing means for sensing interference patterns produced by the reflection of said sub-beams from said test surface, located along said sensing path at a first optical path length from said first Wollaston prism;

polarization sensitive means for directing first and second portions of light reflected from said test surface, through said objective lens and said first and second Wollaston prisms, wherein said first portion of light, being polarized in said first direction, is directed to a first photodetector, and wherein said second portion of light, being polarized in said second direction, is directed to a second photodetector; and means for moving said compound prism assembly in response to an output signal from said first and second photodetectors.

7. The interferometer apparatus of claim 6, wherein said means for moving said compound prism assembly includes:

a piezoelectric actuator moving said compound prism assembly; and a control circuit supplying an electrical signal to said piezoelectric actuator, said control signal being generated in response to an output of said first and second photodetectors.

8. Interferometer apparatus comprising:

means for projecting a light beam along an optical axis, wherein said light beam includes a first sub-beam polarized in a first direction and a second sub-beam polarized in a second direction, said first and second directions being perpendicular to each other and to said optical axis, wherein said means for projecting a light beam includes, a second half-wave plate with a crystal axis at 22.5 degrees from said first direction, and a laser projecting a laser beam polarized in said first direction through said second half-wave plate to said first Wollaston prism;

first and second Wollaston prisms aligned in a series arrangement along said optical axis, wherein said first and second Wollaston prisms are composed of birefringent materials having crystal axes parallel to said first and second directions, wherein said sub-beams are split apart within said first Wollaston prism and directed together by said second Wollaston prism, to intersect at a crossover point outside said second Wollaston prism;

an objective lens with a focal plane at said crossover point;

means for supporting a test specimen with a test surface at a front focal plane of said objective lens;

first beam splitting means between an illumination path along which said laser beam is directed toward said second half-wave plate, and a sensing path;

first sensing means for sensing interference patterns produced by the reflection of said sub-beams from said test surface, located along said sensing path at a first optical path length from said first Wollaston prism;

focus detection beam splitting means directing third and fourth central portions of light reflected from said test surface, through said objective lens and said first and second Wollaston prisms, to a first slit aperture at a second optical path length from said first Wollaston prism, and to a second slit aperture at a third optical path length from said first Wollaston prism, said second optical path length being less than said first optical path length, said third optical path length being greater than said first optical path length;

a third photodetector viewing said third central portion of light through said first slit aperture;

a fourth photodetector viewing said fourth central portion of light through said second slit aperture;

means for generating an error signal in response to a difference in outputs between said third and fourth photodetectors; and means for moving said objective lens along said optical axis in response to said error signal.

9. Interferometer apparatus comprising:

illumination means for generating a coherent beam directed along an optical axis;

beam splitting means disposed along said optical axis, splitting said coherent beam into two diverging, orthogonally polarized sub-beams;

beam redirecting means directing said sub-beams to travel in a convergent angle to intersect at a plane of intersection;

an objective lens with a first focal plane at said plane of intersection;

a test sample with a test surface exposed to said objective lens;

sensing means for sensing interference patterns produced by the combination of said sub-beams reflected from said test sample to be returned through said objective lens, said beam redirecting means and said beam splitting means, said sensing beams being held at a first optical path distance from said beam splitting means;

scanning means for moving said test sample in a direction perpendicular to said optical axis, wherein said scanning means includes a table for holding said test samples, means for rotating said table about an axis of rotation, and means for moving said axis of rotation relative to said objective lens;

autofocus means for maintaining a focussed relationship between said objective lens and said test surface as said test surface is moved past said objective lens by said scanning means; and phase control means for maintaining a phase relationship between reflections of said sub-beams off said test surface as said test surface is moved past said objective lens, wherein said phase control means includes polarization sensitive means for directing light from each of said sub-beams, having been reflected off said test sample, to separate photodetectors, and lateral means for moving said beam splitting means and said beam redirecting means in a lateral direction, perpendicular to said optical axis, in response to outputs of said separate photodetectors.

10. Interferometer apparatus comprising:

illumination means for generating a coherent beam directed along an optical axis;

beam splitting means disposed along said optical axis, splitting said coherent beam into two diverging, orthogonally polarized sub-beams;

beam redirecting means directing said sub-beams to travel in a convergent angle to intersect at a plane of intersection;

an objective lens with a first focal plane at said plane of intersection;

a test sample with a test surface exposed to said objective lens;

sensing means for sensing interference patterns produced by the combination of said sub-beams reflected from said test sample to be returned through said objective lens, said beam redirecting means and said beam splitting means, said sensing means being held at a first optical path distance from said beam splitting means;

scanning means for moving said test sample in a direction perpendicular to said optical axis, wherein said scanning means includes a table for holding said test sample, means for rotating said table about an axis of rotation, and means for moving said axis of rotation relative to said objective lens;

autofocus means for maintaining a focussed relationship between said objective lens and said test surface as said test surface is moved past said objective lens by said scanning means; and phase control means for maintaining a phase relationship between reflections of said sub-beams off said test surface as said test surface is moved past said objective lens, wherein said phase control means includes polarization sensitive means for directing light from each of said sub-beams, having been reflected off said test sample, to separate photodetectors, and lateral means for moving said beam splitting means and said beam redirecting means in a lateral direction, perpendicular to said optical axis, in response to outputs of said separate photodetectors, wherein said lateral means for moving includes a circuit providing a signal to move said beam splitting means and said beam redirecting means to minimize an output signal of either of said separate photodetectors.

11. Interferometer apparatus comprising:

illumination means for generating a coherent beam directed along an optical axis;

beam splitting means disposed along said optical axis, splitting said coherent beam into two diverging, orthogonally polarized sub-beams;

beam redirecting means directing said sub-beams to travel in a convergent angle to intersect at a plane of intersection;

an objective lens with a first focal plane at said plane of intersection;

a test sample with a test surface exposed to said objective lens;

sensing means for sensing interference patterns produced by the combination of said sub-beams reflected from said test sample to be returned through said objective lens, said beam redirecting means and said beam splitting means, said sensing beams being held at a first optical path distance from said beam splitting means;

scanning means for moving said test sample in a direction perpendicular to said optical axis;

autofocus means for maintaining a focussed relationship between said objective lens and said test surface as said test surface is moved past said objective lens by said scanning means, wherein said autofocus means includes a first slit aperture placed at a second optical path distance from said beam splitting means, said second optical path distance being lees than said first optical path distance, a second slit aperture placed at a third optical path distance from said beam splitting means, said third optical path distance being greater than said first optical path distance, a first focus photodetector directed at said first slit aperture, a second focus photodetector directed at said second slit aperture, a focus control circuit comparing outputs of said first and second focus photodetectors, and a focus actuator moving said objective lens along said optical axis In response to said focus control circuit; and phase control means for maintaining a phase relationship between reflections of said sub-beams off said test surface as said test surface is moved past said objective lens.

* * * * *